H. K. BUSHONG.
PLOWING APPARATUS.
APPLICATION FILED JULY 11, 1911.
1,048,808.
Patented Dec. 31, 1912.
6 SHEETS—SHEET 1.
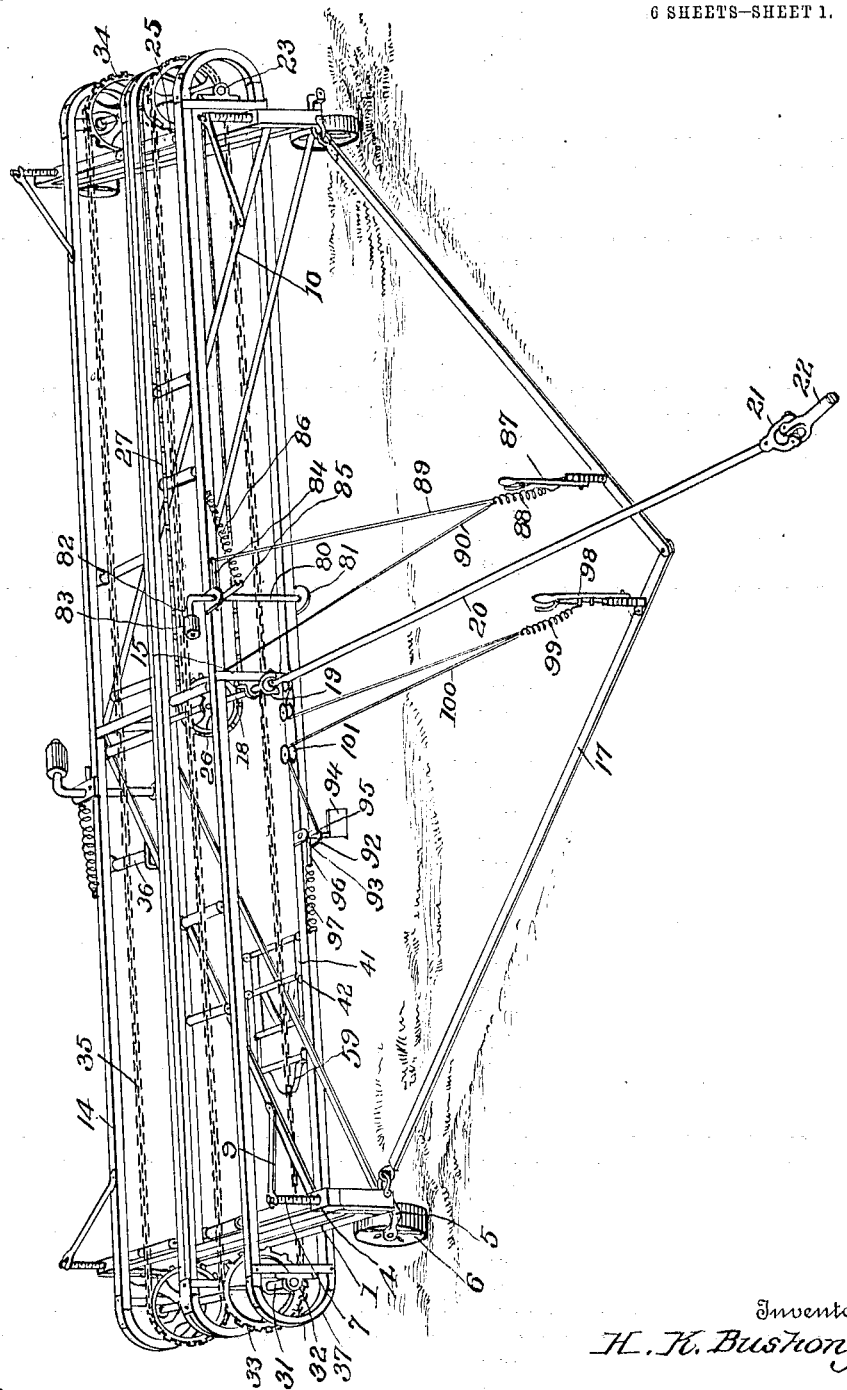

H. K. BUSHONG.
PLOWING APPARATUS.
APPLICATION FILED JULY 11, 1911.
1,048,808.
Patented Dec. 31, 1912.
6 SHEETS—SHEET 2.
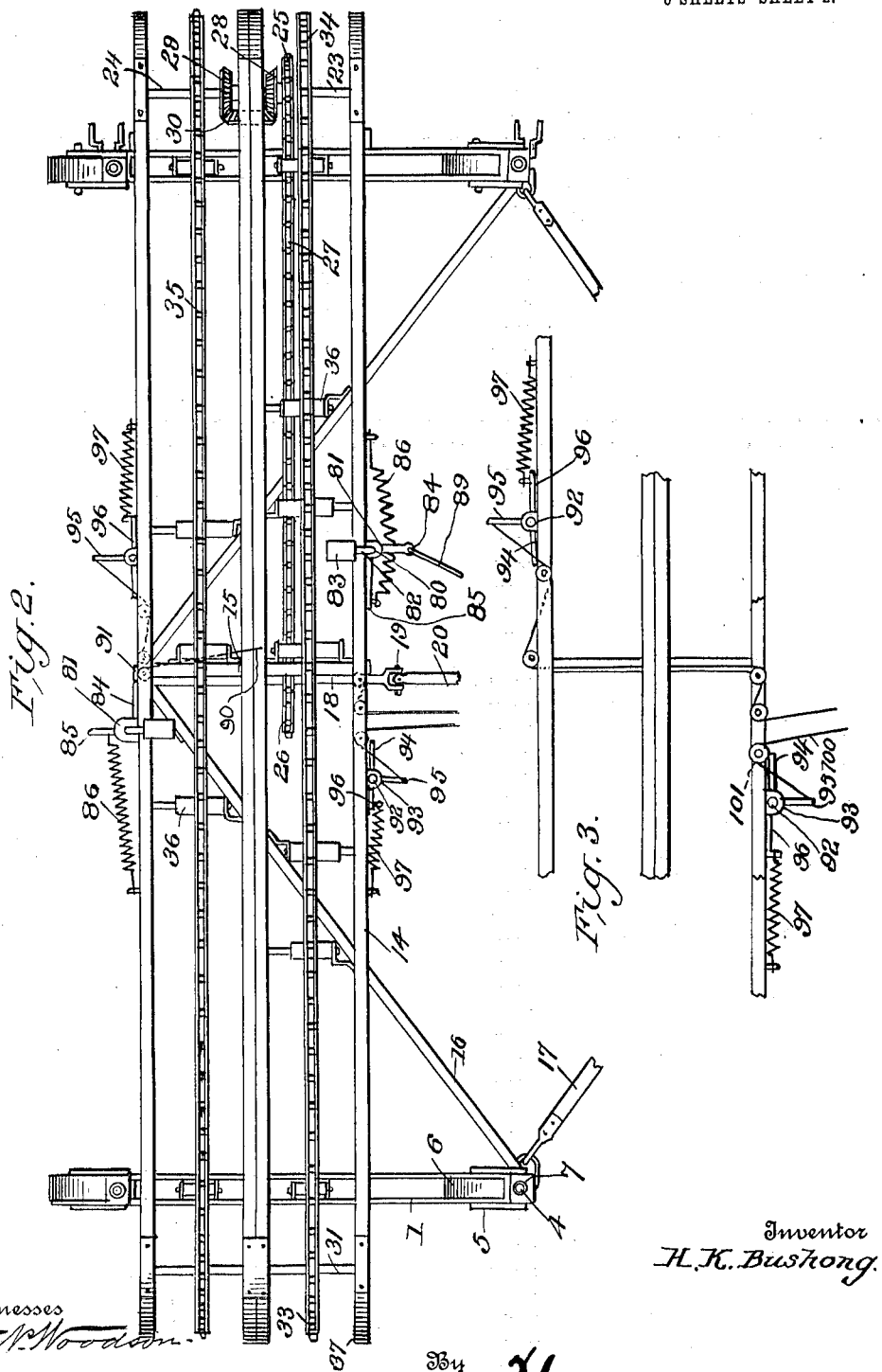

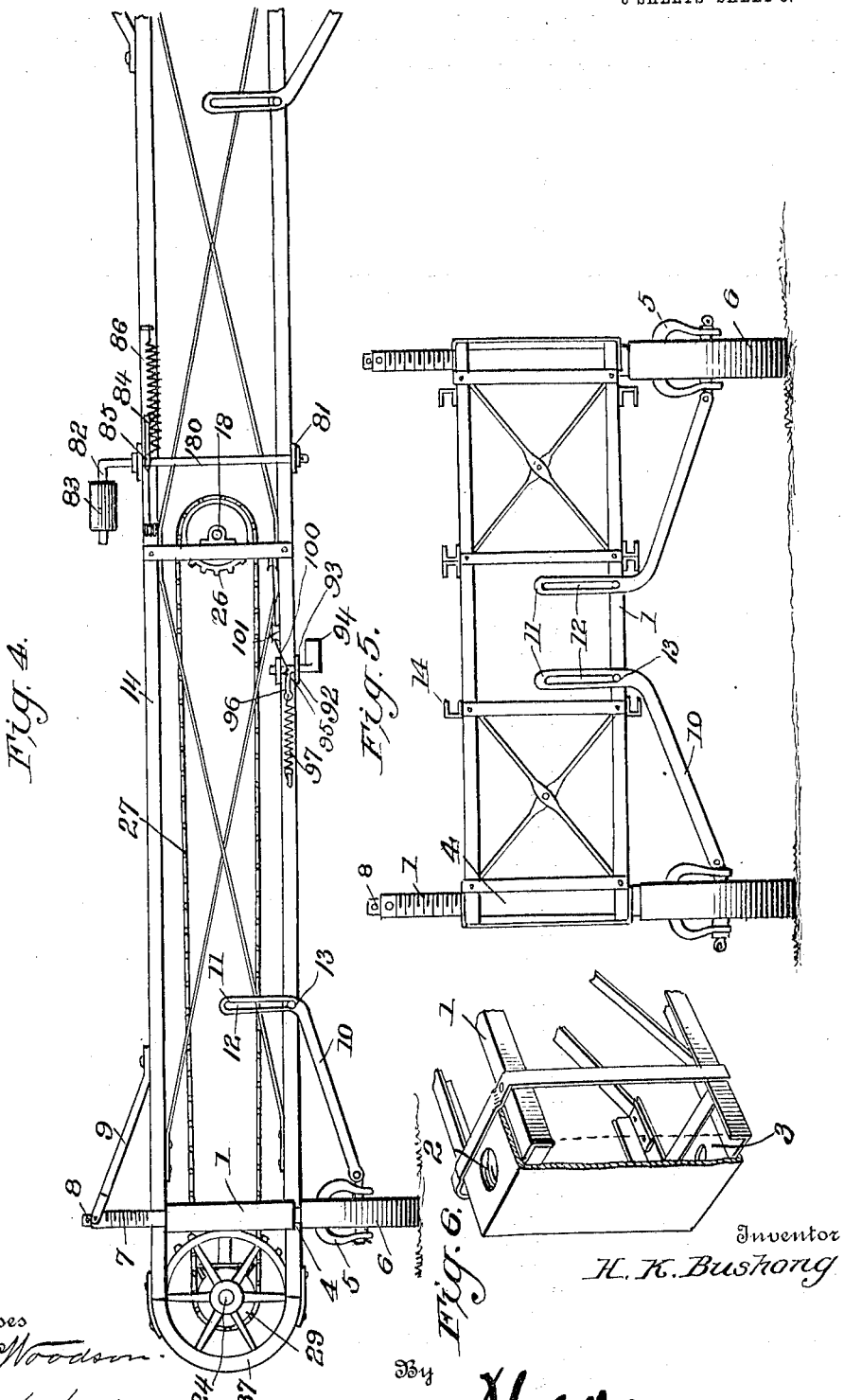

H. K. BUSHONG.
PLOWING APPARATUS.
APPLICATION FILED JULY 11, 1911.
1,048,808.
Patented Dec. 31, 1912.
6 SHEETS—SHEET 4.
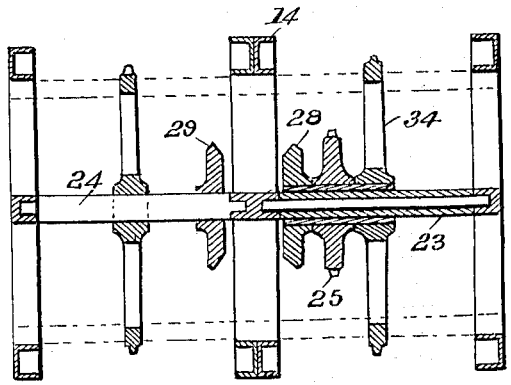
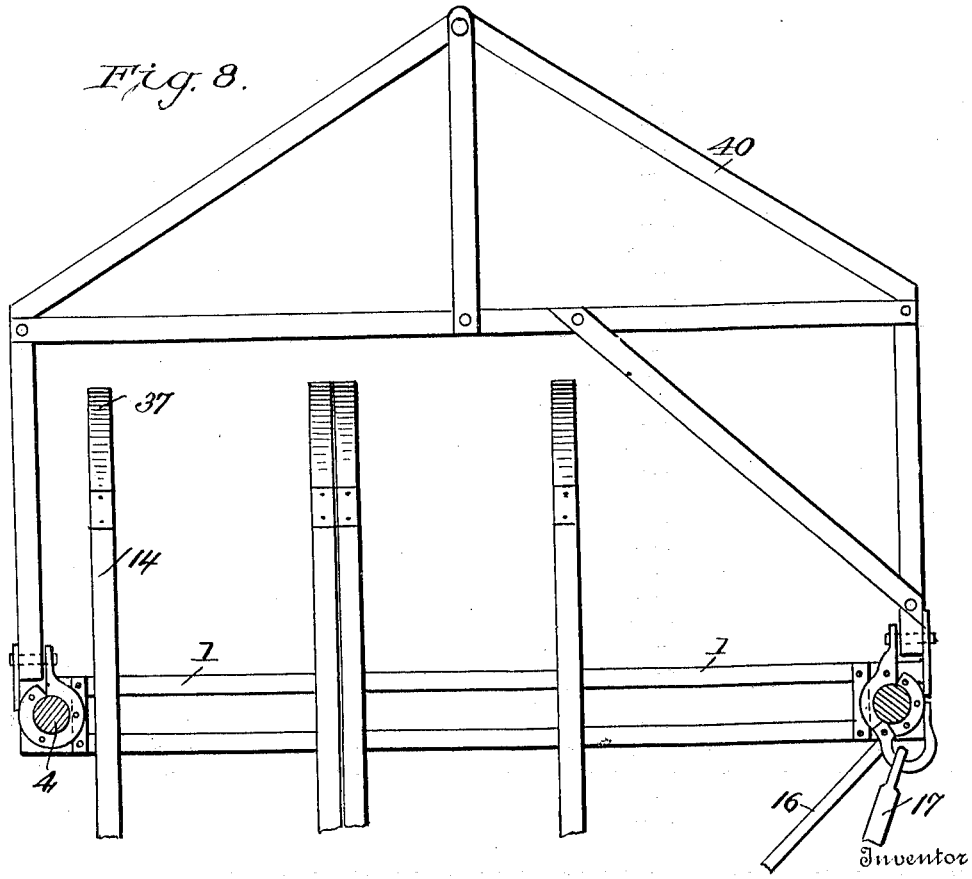
Witnesses
W. N. Woodson
Cora N. Handy
Inventor
H. K. Bushong
By ................, Attorneys

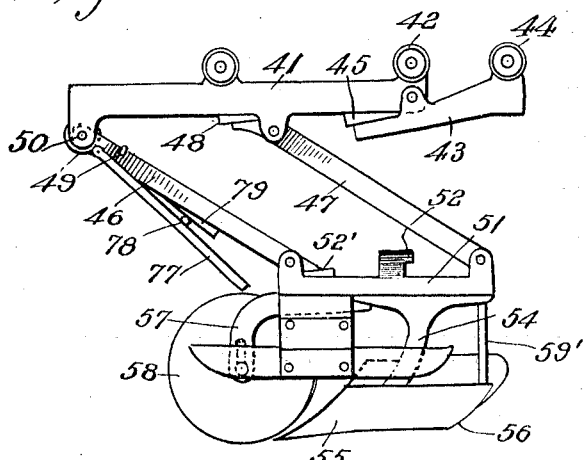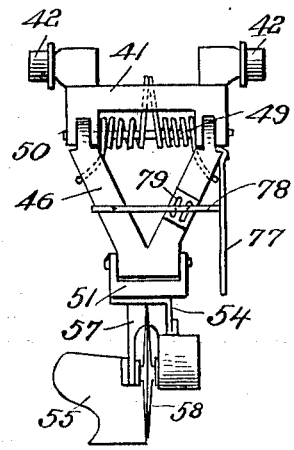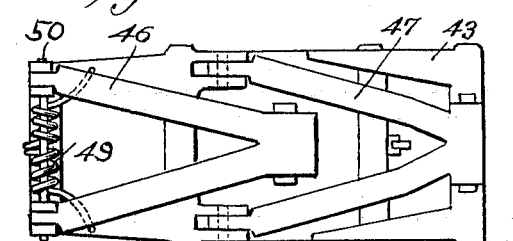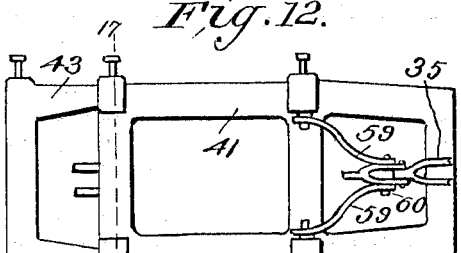

H. K. BUSHONG.
PLOWING APPARATUS.
APPLICATION FILED JULY 11, 1911.
1,048,808.
Patented Dec. 31, 1912.
6 SHEETS—SHEET 6.
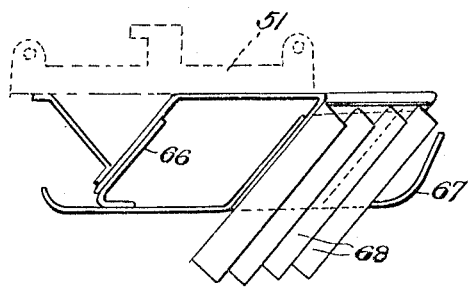
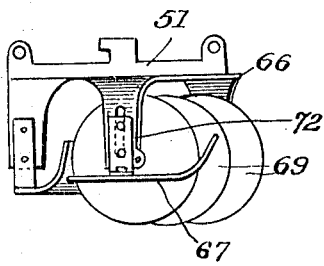
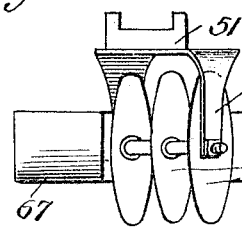
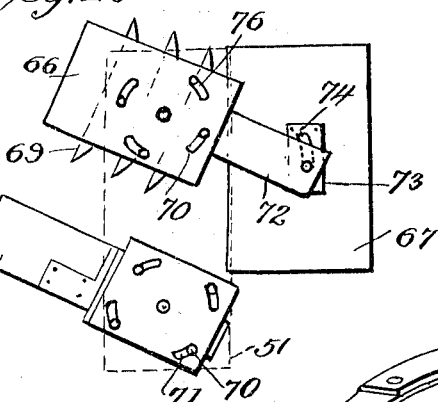
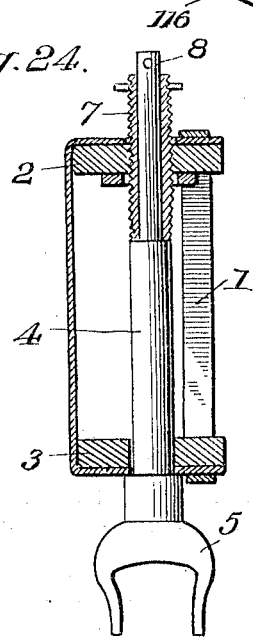
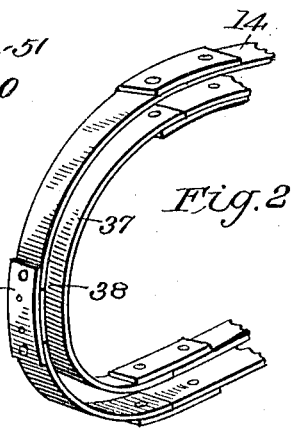
Witnesses
W. N. Woodson
Cora N. Hardy
Inventor
H. K. Bushong
By
Attorneys
COLUMBIA PLANOGRAPH CO., WASHINGTON, D. C.

UNITED STATES PATENT OFFICE.

HUDSON K. BUSHONG, OF BUSHONG, KENTUCKY.

PLOWING APPARATUS.

1,048,808. Specification of Letters Patent. Patented Dec. 31, 1912.

Application filed July 11, 1911. Serial No. 637,868.

*To all whom it may concern:*

Be it known that I, HUDSON K. BUSHONG, citizen of the United States, residing at Bushong, in the county of Monroe and State of Kentucky, have invented certain new and useful Improvements in Plowing Apparatus, of which the following is a specification.

This invention has relation to steam plowing apparatus, and has for its object to provide a structure in which elements are included for simultaneously plowing and harrowing the soil, said parts being so arranged that the plowing and harrowing members move in opposite directions with relation to each other and transversely of the line of draft of the plowing apparatus. By such an arrangement the resistance of the soil against the plowing and harrowing devices is neutralized, so that the apparatus will not have a tendency toward side draft in consequence of the said devices operating in the soil.

Another object of the invention is to provide an apparatus of the character indicated which embraces a substantial structure and includes adjustable parts which may be manipulated to cause the plowing and harrowing devices to operate at any desired depth in the soil.

A still further object of the invention is to provide lever mechanisms operatively connected with tripping devices adapted to engage the plowing and harrowing devices to swing the same into collapsed or close relation to their supporting members, whereby the said plowing and harrowing devices will clear the surface of the soil as they move over the same. And the invention also consists in certain constructions, arrangements and combinations of the parts that I shall hereinafter fully describe and claim.

For a full understanding of the invention reference is to be had to the following description and accompanying drawings, in which:

Figure 1 is a perspective view of the plowing apparatus; Fig. 2 is a top plan view of the same; Fig. 3 is a top plan view of portions of the same; Fig. 4 is a rear elevation of a portion of the same; Fig. 5 is an end elevation of the same with parts positioned for transportation; Fig. 6 is a perspective view of a portion of a cross beam used upon the plowing apparatus; Fig. 7 is a sectional view of part of the means for operating the plowing and harrowing devices; Fig. 8 is a top plan view of an end portion of the plowing apparatus, showing a draft frame applied thereto; Fig. 9 is a side elevation of one of the plowing devices; Fig. 10 is a front end elevation of the same; Fig. 11 is a bottom plan view of the same with the soil engaging devices removed; Fig. 12 is a plan view of the frame of the plowing apparatus; Fig. 13 is a longitudinal sectional view of a portion of the plowing device; Fig. 14 is a top plan view of one end of the carriage showing a latch mechanism used upon the plowing device; Fig. 15 is an inverted sectional elevation of the same; Fig. 16 is a perspective view of a link and a pin used upon the plowing device and shown separated; Fig. 17 is a transverse sectional view of part of the plowing device cut on the line 17—17 of Fig. 12; Fig. 18 is a side elevation of one form of harrowing device which may be used upon the apparatus; Fig. 19 is a side elevation of another form of harrowing device which may be used upon the apparatus; Fig. 20 is a top plan view of the form of harrowing device shown in Fig. 19; Fig. 21 is a front elevation of the form of harrowing device shown in Fig. 20; Fig. 22 is a perspective view of an end portion of one of the guides for carrying the plowing and harrowing devices; Fig. 23 is a perspective view of a plate which is used upon the guide illustrated in Fig. 22; and Fig. 24 is a vertical sectional view of means for adjusting the supporting wheels of the apparatus with relation to the frame thereof.

Corresponding and like parts are referred to in the following description and indicated in all the views of the accompanying drawings by the same reference characters.

The frame of the apparatus includes end beams 1, preferably formed of angle bars 110 connected at their ends by metallic straps or brackets 111 and braced by bands 112 passing around the same, as shown in Figs. 5 and 6, and which are provided at their ends with upper and lower bearing blocks 2 and 3. Stems 4 of caster frames 5 are journaled within the blocks 2 and 3, and caster wheels 6 are journaled between the arms of the caster frame 5. The upper blocks 2 are interiorly screw threaded, and sleeves 7 are journaled upon the upper portions of the stems 4 of the caster frames 5 and engage the threads provided in the blocks 2. Keys 8 pass transversely through the upper ends of the stems 4 and serve as means for preventing the said stems from moving longitudinally with relation to the sleeves 7. A handle lever 9 is fulcrumed upon the upper end of each of the sleeves 7 and may be used for rotating the said sleeves, whereby the sleeves are adjusted longitudinally or vertically with relation to the blocks 2. After the sleeves have been properly adjusted the free end portions of the handle levers 9 are secured to the frame of the apparatus, as indicated in Fig. 1 of the drawings. Braces 10 are pivotally connected at their lower ends with the sides of the caster frames 5 and are provided with vertically disposed portions 11 having elongated slots 12 which receive pins 13 mounted upon the sides and ends of the frame of the plowing apparatus, as most clearly shown in Figs. 4 and 5 of the drawings. Therefore it will be seen that as the caster frames 5 are adjusted vertically with relation to the frame of the plowing apparatus, the braces 10 may move with the said caster frames, but the said braces 10 will restrain the caster frames against pivotal movement within the bearing blocks 2 and 3 of the end beams 1. The braces 10 also turn with the caster frames when the parts are positioned for transportation and may be secured to the end of the frame of the plow as shown in Fig. 5, but when the plow is in operation in a field the braces 10 are secured to the lower members of the sides of the frame of the plow as illustrated in detail in Fig. 4.

Guides 14, formed preferably from channel iron, are supported at the upper and lower sides of the beams 1, the said guides being arranged in sets one in advance of the other, and the forward set adapted to carry plowing devices and the rear set adapted to carry harrowing devices, as will be hereinafter explained. A cross beam 15 is carried by the guides 14 at a point midway between the end beams 1 and brace rods 16 are connected at their forward ends with the forward ends of the end beams 1 and at their rear ends with the rear end of the intermediate beam 15. The free end portions of the levers 9 may be secured to the upper brace rods 16, as illustrated in Fig. 1, and the free end portions of the rear levers 9 may be secured to the upper side of the uppermost and rearmost guide 14, as illustrated in the said figure. Draft rods 17 are pivotally connected together at their inner ends and at their outer ends are pivotally connected with the forward ends of the end beams 1, as shown in Fig. 1. These rods are adapted to be connected with the coupling of a traction engine (not shown).

A shaft 18 is journaled in bearings supported by the intermediate beam 15 and its forward end is connected by means of a universal joint 19 with the rear end of a shaft section 20. The forward end of the said section 20 is connected by means of a universal joint 21 with a shaft section 22 which may be operated in any appropriate manner from the crank shaft of the traction engine above referred to.

Alined shafts 23 and 24 are journaled for rotation in bearings provided upon posts between the guides 14 and a sprocket wheel 25 is fixed to the shaft 23. A sprocket wheel 26 is fixed to the shaft 18 and a sprocket chain 27 is trained around the sprocket wheels 25 and 26 and is adapted to transmit rotary movement from the shaft 18 to the shaft 23. A beveled pinion 28 is fixed to the shaft 23, and a beveled pinion 29 is fixed to the shaft 24. A beveled pinion 30 is journaled for rotation upon the adjacent end beam 1 and meshes with both of the beveled pinions 28 and 29, whereby as the beveled pinion 28 is rotated in one direction the beveled pinion 29 is rotated in the opposite direction. Alined shaft sections 31 are journaled in bearings 32 carried by the guides 14 and are located at the opposite ends of the guides from that end at which the shafts 23 and 24 are located. Sprocket wheels 33 are carried by the shafts 31 and sprocket wheels 34 are carried by the shafts 23 and 24. Sprocket chains 35 are trained around the sprocket wheels 33 and 34 and are arranged to move simultaneously in opposite directions. Rollers 36 are journaled upon the frame of the apparatus and are located under the intermediate portions of the upper runs of the chains 35 and serve to support the said chains in approximately horizontal positions. The adjacent ends of the upper and lower guides 14 are connected by arcuate guide sections 37 some of which are provided in their outer flanges with openings 38 which are normally closed by detachable plates 39. This structure is best illustrated in Figs. 22 and 23 of the drawings.

A draft frame 40, illustrated in Fig. 8 of the drawings, is adapted to be applied to the beam 1 at one end of the frame of the plowing apparatus, and may be used for the purpose of connecting the plowing apparatus with a traction engine when it is desired to transport the apparatus from one point to another. When the apparatus is thus connected with the traction engine its long dimension is in the line of draft and its short dimension transversely thereof, and consequently the apparatus may be readily passed through gates and along roads or other places where space is comparatively limited. When the apparatus is transported from one place to another, as above indicated, the wheels 6 are turned so that their planes are parallel with the line of draft of the apparatus. This arrangement is best illustrated in Fig. 5 of the drawings.

The carriage frame 41 of a plowing device is provided at its edge with rollers 42 which are adapted to travel in the guides 14 at the forward portion of the frame of the plowing apparatus. A frame section 43 is pivoted to one end of the frame 41 and is also provided with rollers, indicated at 44, which are adapted to travel in the forward guides upon the frame of the plowing apparatus. The swinging movement of the frame section 43 with relation to the frame 41 is limited by means of a wedge block 45 which is interposed between the said frame and frame section, as indicated in Fig. 9 of the drawings, and may be adjusted in its position to limit the relative swinging movement of the said parts. An arm 46 is pivoted at its upper end to the forward portion of the frame 41, and a similar arm 47 is pivoted at its upper end to the intermediate portion of the frame 41. A wedge block 48 is interposed between the upper end of the arm 47 and the lower side of the frame 41 and serves as means for limiting the swinging movement of the arm 47 with relation to the frame 41. Springs 49 are secured at one end to the frame 41 and are coiled about a pivot pin 50 which serves as the connecting means for the arm 46 with the frame 41, and the outer ends of the said springs 49 bear against the opposite side portions of the arm 46. The springs 49 are under tension with a tendency to hold the arm 46 swung down at an angle to the frame 41. A bar 51 is pivotally carried at the lower ends of the arms 46 and 47, and a wedge shaped block 52' is interposed between the lower end of the arm 46 and the upper surface of the bar 51 and serves as means for limiting the relative swinging movement of the bar 51 with respect to the arm 46. The blocks 48 and 52' are held in position upon the frame 41 and bar 51 respectively by means of tap screws or other suitable securing devices (not shown). A lug 52 is mounted upon the top of the bar 51 and at times is adapted to be engaged by a spring supported latch 53 mounted at the rear end of the frame 41. A standard 54 is carried by the bar 51 and in turn carries a plow body 55 the heel portion of the landside plate of which is curved or cut away, as at 56, to prevent riding as the plow leaves the ground. An arm 57 is carried by the bar 51 and in turn carries a colter 58 which is located in advance of the plow body 55 in the usual manner. A brace 59' is provided between the rear end of the bar 51 and the rear end of the landside plate of the plow body 55. A bracket 113 is secured to and depends from the bar 51 and has a runner or slide 114 carried by its lower end. The bracket 113 is extensible so that the runner 114 may be adjusted to regulate the depth of the furrow. Links 59 pivotally connect the frame 41 with the foremost chain 35 by means of key pins 60, illustrated in Fig. 16 of the drawings. A flat spring 61 is secured at one end to the side of the frame 41 and at its other end bears against the catch 53 at one side of the pivotal support thereof. A bell crank lever 62 is fulcrumed upon the frame 41 and a link 63 connects one end of the said bell crank lever with the catch 53 at one side of the fulcrum point thereof. A bell crank lever 64 is fulcrumed upon the frame 41 and one end thereof is pivotally connected with the end of the bell crank lever 62 by means of a link 65. One end of the bell crank lever 64 projects laterally beyond the side of the frame 41, as illustrated in Fig. 14 of the drawings, and the frame is provided with suitable openings or cut-away portions so that the several parts just described may be arranged to bring the projecting end of the crank lever 64 into the same horizontal plane with the tappets hereinafter referred to.

The parts just described constitute the plowing device of the apparatus, and the general structure of the harrowing device is substantially the same as the major part of the plowing device. However, in the harrowing device, a standard 66 is attached to the bar 51 and is provided with a runner 67 which slides on the surface of the ground and smooths the same at the side of the furrow, also regulating the depth to which the harrow teeth may cut. In the form of harrowing device shown in Fig. 18 blades 68 are employed, while in the form as illustrated in Figs. 19 and 20 disks 69 are employed, a runner or drag being disposed at the side of the disks to regulate the depth of the cut, as in the form shown in Fig. 18. In the disk harrow, an additional runner 116 is provided to follow the disks and smooth the surface of the ground so that it will be in condition for planting. This runner 116 is provided with upstanding arms 117 to be adjustably secured to a standard 118 which is similar to the standard 66. In the form of harrowing device as illustrated in Fig. 20, means are provided for turning the disks 69 to any desired angle with relation to the line of travel and for holding the said disks in such adjusted position. Threaded pins 70 on the bar 51 pass through arcuate slots 71 provided in the standard 66, the said standard being pivotally mounted on the bar 51 and the slots 71 following a circle having the pivot as its center. An arm 72 is secured to the standard 66 by a slot and bolt connection whereby it may be adjusted vertically on the standard, as will be understood on reference to Fig. 19, and the said arm in turn is provided with a bolt 73 which engages an arcuate slot 74 provided in the runner 67 so that the runner may be maintained in parallel relation to the bar 51 notwithstanding the angular adjustment of the harrow disks. The runner or drag 116 is secured to the bar 51 in the same manner as the standard 66 is secured thereto so that said runner may be parallel with the harrow in all positions of the latter.

A rod 77 is pivotally mounted upon the arm 46, and a rod 78 is connected at its outer end with the intermediate portion of the rod 77. A wedge shaped block 79 is slidably mounted upon the arm 46 and is interposed between the said arm and rod 78. When this block is shifted the position of the rod 77 with relation to the arm 46 is adjusted.

Vertically disposed shafts 80 are journaled in brackets 81 provided upon the upper and lower guides 14 at the forward and rear portion of the frame of the apparatus. The said shafts 80 are provided with angularly disposed extremities 82 upon which rollers 83 are journaled. Each shaft 80 is provided with an arm 84 and an arm 85. Coil springs 86 are connected at one end with the arms 85 and at their other ends with the guides 14 and are under tension with a tendency to hold the shafts 80 so that their extremities 82 are approximately parallel with the guides 14. A lever 87 is fulcrumed upon one of the draft bars 17 and one end of a spring 88 is connected with the said lever. The other end of the said spring 88 is connected by means of a cable 89 with the arm 84 upon the foremost shaft 80. The rear end of the spring 88 is also connected by a cable 90 with the arm 84 upon the rearmost shaft 80. The intermediate portion of the cable 90 is trained around a pulley 91 journaled upon the frame of the apparatus. Consequently it will be seen that when the lever 87 is swung in a forward direction the spring 88 and cables 89 and 90 connected with the arms 84 of the shafts 80 will partially rotate the said shafts against the tension of the springs 86 and the extremities 82 of the said shafts will be moved from positions approximately parallel to the guides 14 to positions transverse thereof, and the rollers 83 will be carried into the paths of movement of the rods 77 carried by the arms 46, and consequently as the frames 41 pass the rollers 83 the arms 46 and 47 are swung down against the tension of the springs 49 and the lugs 52 are engaged with the catches 53, as indicated in Fig. 15 of the drawings, and the bars 51 and their attachments are held in close relation to the chains 35, and consequently the plowing and harrowing devices will clear the top surface of the soil or fail to come in contact with the same as the said devices are moved along the guides 14. The tension of the combined springs 86 is greater than the normal tension of the spring 88, consequently as soon as pressure is released from the lever 87 the tension of the springs 86 comes into play and the shafts 80 are swung so that their extremities 82 are moved into approximately parallel relation with respect to the guides 14.

Shafts 92 are journaled in brackets 93 provided upon the lowermost forward and rear guides 14 and the said shafts 92 carry tappets 94 which normally extend approximately parallel with relation to the guides. Arms 95 and 96, are carried by the said shafts 92 and coiled springs 97 are attached at their inner ends to the arms 96 and at their outer ends to the sides of the adjacent guides 14. These springs are under tension with a tendency to normally hold the tappets 94 in parallel relation to the guides. A lever 98 is fulcrumed upon one of the draft bars 17 and the forward end of a coil spring 99 is attached to the said lever. The forward ends of cables 100 are connected with the rear end of the spring 99, and the intermediate portions of the said cables 100 are trained around pulleys 101 journaled upon the frame of the apparatus, and the rear ends of the said cables are connected with the arms 95 extending from the shafts 92. The tension of the combined springs 97 is greater than the normal tension of the spring 99. Consequently it will be seen that when the lever 98 is swung the cables 100 will be moved longitudinally, whereby the shafts 92 will be swung so that the tappets 94 will be turned into the paths of the projecting ends of the bell crank levers 64 on the carriage frames 41. As the said bell crank levers 64 strike the tappets 94 the levers 64 are swung and in turn move the links 65 horizontally whereupon the levers 62 are swung and move the links 63, whereby the catches 53 are swung upon their pivotal supports against the tension of the springs 61 and release the lugs 52. The bars 51 and the lower ends of the arms 46 and 47 then swing downward under the tension of the springs 49. Thus the plowing and harrowing devices are lowered in position so that they will operate in the soil.

When it is desired to transport the apparatus from point to point, by connecting the draft frame 40 with the frame of a traction engine the inner ends of the draft rods 17 are disconnected from each other and the said rods are folded in over the intermediate portion of the frame of the apparatus.

The frame of the machine is so mounted upon the wheels that the said wheels may turn as the frame is moved over ground of uneven surface, whereby the wheels at all times will bear against the surface of the ground. The runner as used at the side of the plow may be adjusted vertically so as to regulate the depth at which the plow will cut in the soil. As shown in Fig. 19 a drag is provided upon the gang of disks and this drag is adapted to smooth the soil after it has been turned by the disks.

The parts are so arranged that while the plows are moving from one end of the frame to the other the machine is drawn in a forward direction just the width of the furrow so that the entire surface of the soil is operated upon by the plows. The harrow members operate upon the surface of the soil in a similar manner, but as hereinbefore stated the said harrow members and the plows cast the soil in the line of draft so that tendency to side draft is eliminated.

The earth engaging implements are drawn continuously around the elliptical frame and they may be arranged in series of any desired number of units. For instance, there may be two or more plow bodies and two or more harrowing devices. The frames 41 are provided with the hinged sections 43 in order that the said sections 43 and the rollers 44 carried thereby may brace the rollers 42 carried by the frames 41 when the implements attached to the frames 41 are in the soil. In other words, the presence of the frames 43 with their rollers increases the bearing connection between the frames 41 and the guides 14. Inasmuch as the section 43 materially lengthens the structure of which the parts 41 and 43 are components, it is necessary that the section 43 swing with relation to its attached frame 41 when the implement passes around the ends of the ellipses formed by the guides 14 and their attachments. Therefore the sections 43 are hingedly connected with the frames 41.

The guide sections 37 which are connected with the ends of the guides 14 are provided with openings 38 and plates 39 in order that the soil engaging devices may be detached from the apparatus if desired. When the soil engaging devices are upon the frame the plates 39 may be removed, thus uncovering the opening 38, and the rollers 42 and 44 may be passed out of the guides through said openings. The reverse of the above described operation is followed when the parts are being assembled.

Having thus described the invention, what I claim as new is:

1. A plowing apparatus, comprising a wheel mounted frame, soil engaging members mounted upon the frame and operatively connected together for simultaneous movement in opposite directions transversely of the line of draft of the apparatus, and means for operating the soil engaging members, the paths of movement of the said soil engaging members being of equal lengths and located directly one behind the other transversely of the line of draft of the apparatus.

2. A plowing apparatus comprising a wheel mounted frame, supporting members operatively connected together and mounted upon the frame for simultaneous movement in opposite directions transversely of the line of draft of the apparatus, means for operating said members, soil engaging members carried by the supporting members, and means for raising and lowering the soil engaging members with relation to the supporting members to which they are attached.

3. A plowing apparatus comprising a wheel mounted frame, supporting members operatively connected together for simultaneous movement in opposite directions transversely of the line of draft of the apparatus, means for operating said members, sets of soil engaging members carried by the supporting members, and means for simultaneously raising and lowering the corresponding soil engaging members of the several sets with relation to their respective supporting members.

4. A plowing apparatus comprising a wheel mounted frame including channeled guides, said guides having detachable channeled sections, carriage frames having rollers traveling in the guides, soil engaging members carried by said frames, and means for moving the carriage frames along the guides simultaneously in opposite directions transversely of the line of draft of the apparatus.

5. A plowing apparatus comprising a wheel mounted frame, endless supporting members mounted for orbital movement thereon simultaneously in opposite directions transversely of the line of draft of the apparatus, means for moving the said members, soil engaging members carried by the supporting members, means for lowering the soil engaging members with relation to their respective supporting members when the soil engaging members are at the lower runs of the supporting members, and means for lowering the soil engaging members relative to the supporting members when on the upper runs of the supporting members.

6. A plowing apparatus, comprising a wheel mounted frame, soil engaging members mounted for simultaneous orbital movement upon the frame in opposite directions transversely of the line of draft of the apparatus, resilient means for holding the soil engaging members away from their supports, means for moving and holding the soil engaging members in close relation to their supports, and means for releasing the soil engaging members as they move along the lower runs of their orbits.

7. A plowing apparatus, comprising a wheel mounted frame including guides, chains mounted for orbital movement along the guides in opposite directions transversely of the line of draft of the apparatus, means operatively connecting the chains together, frames pivotally connected to the chains, soil engaging members carried by the frames, resilient supporting means for holding the soil engaging members projected laterally with relation to the chains, means adapted to be projected into the paths of movement of the soil engaging members to be encountered by them, whereby they may gravitate toward the supporting chains, and securing devices for holding the soil engaging members in retracted positions upon the chains.

8. A plowing apparatus comprising a wheel mounted frame including spaced guides connected together by return bends, a frame composed of hinged sections and arranged to move along the guides and around the return bends, and a soil engaging member carried by the last mentioned frame.

9. In a plowing apparatus, the combination of a frame, endless conveyers mounted thereon, means for operating the conveyers, carriages connected to said conveyers, soil engaging members hung on the carriages, means on the carriages to hold the soil engaging members normally projected from the carriages, projections on the frame adapted to engage the soil engaging members and move them to the carriages, means for moving said projections into and out of the path of the soil engaging members, and latches on the carriages to engage the soil engaging members and hold them to the carriages.

10. In a plowing apparatus, the combination of a frame, endless conveyers mounted thereon, means for operating the conveyers, carriages connected to said conveyers, soil engaging members hung on the carriages, means on the carriages to hold the soil engaging members normally projected from the carriages, projections on the frame adapted to engage the soil engaging members and move them to the carriages, means for moving said projections into and out of the path of the soil engaging members, latches on the carriages to engage the soil engaging members and hold them to the carriages, levers connected with said latches and projecting laterally from the carriages, tappets adapted to be engaged by said levers to release the latches, and means for moving the tappets into and out of the paths of said levers.

In testimony whereof, I affix my signature in presence of two witnesses.

HUDSON K. BUSHONG. [L. S.]

Witnesses:
SHERMAN SPEAR,
S. J. BUSHONG.

---

Copies of this patent may be obtained for five cents each, by addressing the "Commissioner of Patents, Washington, D. C."